United States Patent
Daido

(10) Patent No.: US 12,175,242 B2
(45) Date of Patent: Dec. 24, 2024

(54) DECISION TREE NODE INSTRUCTION UNIFICATION FOR PARALLEL PROCESSING

(71) Applicant: NEC Corporation, Tokyo (JP)

(72) Inventor: Osamu Daido, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/010,948

(22) PCT Filed: Jun. 25, 2020

(86) PCT No.: PCT/JP2020/025048
§ 371 (c)(1),
(2) Date: Dec. 16, 2022

(87) PCT Pub. No.: WO2021/260888
PCT Pub. Date: Dec. 30, 2021

(65) Prior Publication Data
US 2023/0237097 A1     Jul. 27, 2023

(51) Int. Cl.
*G06F 9/30* (2018.01)
*G06F 8/40* (2018.01)
*G06F 9/38* (2018.01)

(52) U.S. Cl.
CPC ............ *G06F 9/30021* (2013.01); *G06F 8/40* (2013.01); *G06F 9/30181* (2013.01); *G06F 9/3887* (2013.01)

(58) Field of Classification Search
CPC ..... G06F 8/30; G06F 8/40; G06F 8/44; G06F 8/443; G06F 8/4441; G06F 8/445;
(Continued)

(56) References Cited

U.S. PATENT DOCUMENTS

| | | | | |
|---|---|---|---|---|
| 4,542,456 A | * | 9/1985 | Hill ...................... | G06F 9/30021 712/E9.02 |
| 2005/0289529 A1 | * | 12/2005 | Almog ................. | G06F 9/3885 712/E9.071 |

(Continued)

FOREIGN PATENT DOCUMENTS

| | | | |
|---|---|---|---|
| CN | 113407154 A | * | 9/2021 |
| JP | 2013-117862 A | | 6/2013 |

(Continued)

OTHER PUBLICATIONS

International Search Report for PCT Application No. PCT/JP2020/025048, mailed on Sep. 29, 2020.

(Continued)

*Primary Examiner* — David J. Huisman

(57) ABSTRACT

An information processing device performs a decision tree based on a decision tree which has condition determination nodes and leaf nodes. In the information processing device, an instruction unification means generates a unified instruction by unifying an instruction, which each of the condition determination nodes included in the decision tree executes, to be suitable for a parallel processing. An acquisition means acquires a plurality of pieces of input data. A condition determination means performs, by the parallel processing, a condition determination with respect to the plurality of pieces of input data for each of the condition determination nodes.

9 Claims, 12 Drawing Sheets

DATA TO BE INFERRED

| No | FEATURE A | FEATURE B | FEATURE C |
|---|---|---|---|
| 1 | 0.0 | 1 | 0.3 |
| 2 | 4.1 | 2 | 0.2 |
| 3 | 6.2 | 0 | 0.1 |
| 4 | 2.3 | 1 | 0.4 |
| 5 | 7.4 | 0 | 0.0 |
| 6 | 3.5 | 2 | 0.7 |
| 7 | 8.6 | 1 | 0.6 |
| 8 | 9.7 | 2 | 0.9 |

CURRENT STATE

| CURRENT STATE | FEATURES | | COMPARISON OPERATION | RESULT | LEAF |
|---|---|---|---|---|---|
| 2 | B | 1 | 1 ≤ 1 ≤ 1 | true | |
| 2 | B | 2 | 1 ≤ 2 ≤ 1 | false | |
| 3 | C | 0.1 | −∞ ≤ 0.1 ≤ 0.499··· | true | |
| 2 | B | 1 | 1 ≤ 1 ≤ 1 | true | |
| 3 | C | 0.0 | −∞ ≤ 0.0 ≤ 0.499··· | true | |
| 2 | B | 2 | 1 ≤ 2 ≤ 1 | false | |
| 3 | C | 0.6 | −∞ ≤ 0.6 ≤ 0.499··· | false | |
| 3 | C | 0.9 | −∞ ≤ 0.9 ≤ 0.499··· | false | |

(58) Field of Classification Search
CPC .. G06F 8/447; G06F 9/30018; G06F 9/30021; G06F 9/30036; G06F 9/30038; G06F 9/3005; G06F 9/3017; G06F 9/30181; G06F 9/38; G06F 9/3851; G06F 9/3854; G06F 9/3885; G06F 9/3887; G06F 9/38873; G06F 9/3875; G06F 9/3888; G06F 9/38885

See application file for complete search history.

(56) References Cited

U.S. PATENT DOCUMENTS

| | | |
|---|---|---|
| 2013/0185239 A1 | 7/2013 | Dedeoglu et al. |
| 2013/0246753 A1 | 9/2013 | Bradbury et al. |
| 2013/0246758 A1 | 9/2013 | Bradbury et al. |
| 2017/0011294 A1 | 1/2017 | Jagannathan et al. |

FOREIGN PATENT DOCUMENTS

| | | |
|---|---|---|
| JP | 2015-513749 A | 5/2015 |
| JP | 2017-224070 A | 12/2017 |
| JP | 2018-520443 A | 7/2018 |

OTHER PUBLICATIONS

JP Office Action for JP Application No. 2022-532182, mailed on Dec. 26, 2023 with English Translation.

\* cited by examiner

FIG. 4

DECISION TREE MODEL

DATA TO BE INFERRED

| No | FEATURE A | FEATURE B | FEATURE C |
|---|---|---|---|
| 1 | 0.0 | 1 | 0.3 |
| 2 | 4.1 | 2 | 0.2 |
| 3 | 6.2 | 0 | 0.1 |
| 4 | 2.3 | 1 | 0.4 |
| 5 | 7.4 | 0 | 0.0 |
| 6 | 3.5 | 2 | 0.7 |
| 7 | 8.6 | 1 | 0.6 |
| 8 | 9.7 | 2 | 0.9 |

CURRENT STATE

| CURRENT STATE | FEATURES | | COMPARISON OPERATION | RESULT | LEAF |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |

FIG. 5

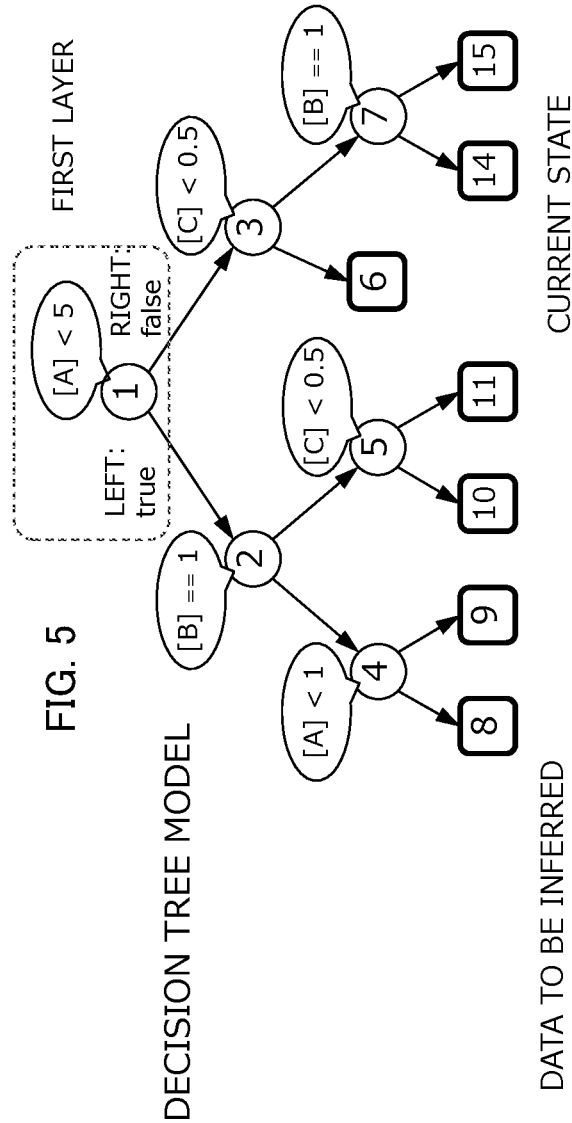

DECISION TREE MODEL

DATA TO BE INFERRED

| No | FEATURE A | FEATURE B | FEATURE C |
|---|---|---|---|
| 1 | 0.0 | 1 | 0.3 |
| 2 | 4.1 | 2 | 0.2 |
| 3 | 6.2 | 0 | 0.1 |
| 4 | 2.3 | 1 | 0.4 |
| 5 | 7.4 | 0 | 0.0 |
| 6 | 3.5 | 2 | 0.7 |
| 7 | 8.6 | 1 | 0.6 |
| 8 | 9.7 | 2 | 0.9 |

CURRENT STATE

| CURRENT STATE | FEATURES | | COMPARISON OPERATION | RESULT | LEAF |
|---|---|---|---|---|---|
| 1 | A | 0.0 | $-\infty \leq 0.0 \leq 4.999\ldots$ | true | |
| 1 | A | 4.1 | $-\infty \leq 4.1 \leq 4.999\ldots$ | true | |
| 1 | A | 6.2 | $-\infty \leq 6.2 \leq 4.999\ldots$ | false | |
| 1 | A | 2.3 | $-\infty \leq 2.3 \leq 4.999\ldots$ | true | |
| 1 | A | 7.4 | $-\infty \leq 7.4 \leq 4.999\ldots$ | false | |
| 1 | A | 3.5 | $-\infty \leq 3.5 \leq 4.999\ldots$ | true | |
| 1 | A | 8.6 | $-\infty \leq 8.6 \leq 4.999\ldots$ | false | |
| 1 | A | 9.7 | $-\infty \leq 9.7 \leq 4.999\ldots$ | false | |

DECISION TREE MODEL

DATA TO BE INFERRED

| No | FEATURE A | FEATURE B | FEATURE C |
|---|---|---|---|
| 1 | 0.0 | 1 | 0.3 |
| 2 | 4.1 | 2 | 0.2 |
| 3 | 6.2 | 0 | 0.1 |
| 4 | 2.3 | 1 | 0.4 |
| 5 | 7.4 | 0 | 0.0 |
| 6 | 3.5 | 2 | 0.7 |
| 7 | 8.6 | 1 | 0.6 |
| 8 | 9.7 | 2 | 0.9 |

CURRENT STATE

| CURRENT STATE | FEATURES | | COMPARISON OPERATION | RESULT | LEAF |
|---|---|---|---|---|---|
| 2 | B | 1 | $1 \leq 1 \leq 1$ | true | |
| 2 | B | 2 | $1 \leq 2 \leq 1$ | false | |
| 3 | C | 0.1 | $-\infty \leq 0.1 \leq 0.499\cdots$ | true | |
| 2 | B | 1 | $1 \leq 1 \leq 1$ | true | |
| 3 | C | 0.0 | $-\infty \leq 0.0 \leq 0.499\cdots$ | true | |
| 2 | B | 2 | $1 \leq 2 \leq 1$ | false | |
| 3 | C | 0.6 | $-\infty \leq 0.6 \leq 0.499\cdots$ | false | |
| 3 | C | 0.9 | $-\infty \leq 0.9 \leq 0.499\cdots$ | false | |

DECISION TREE NODE INSTRUCTION UNIFICATION FOR PARALLEL PROCESSING

This application is a National Stage Entry of PCT/JP2020/025048 filed on Jun. 25, 2020, the contents of all of which are incorporated herein by reference, in their entirety.

TECHNICAL FIELD

The present disclosure relates to an inference process using a decision tree.

BACKGROUND ART

In recent years, there has been a demand for high speed processing of a large amount of data. One method of speeding up data processing is parallelization of processing. For example, a repetitive process that can independently operate a plurality of pieces of data can be expanded and processed in parallel. As a system of parallel processing, a SIMD (Single Instruction Multiple Data) method is known. The SIMD is a parallel processing method that speeds up a process by executing one instruction simultaneously on the plurality of pieces of data. Examples of SIMD processors include a vector processor, a GPU (Graphics Processing Unit), and the like.

Patent Document 1 describes a technique in which the parallel processing is applied to an inference using a decision tree. In Patent Document 1, identification information and a condition determination result of each node in the decision tree are expressed in binary numbers so that the condition determination of each layer can be collectively processed.

PRECEDING TECHNICAL REFERENCES

Patent Document

Patent Document 1: Japanese Laid-open Patent Publication No. 2013-117862

SUMMARY

Problem to be Solved by the Invention

However, in a technique of Patent Document 1, since all data are used to process all condition determination nodes, the process is not conducted efficiently.

It is one object of the present disclosure to speed up the inference process using a decision tree by parallel processing.

Means for Solving the Problem

According to an example aspect of the present disclosure, there is provided an information processing device including:
an instruction unification means configured to unify respective instructions executed by condition determination nodes included in a decision tree, and generate a unified instruction;
an acquisition means configured to acquire a plurality of pieces of input data; and
a condition determination means configured to perform, by a parallel processing, condition determinations with respect to the plurality of pieces of input data using the unified instruction for each of the condition determination nodes.

According to another example aspect of the present disclosure, there is provided an information processing method, including:
unifying respective instructions executed by condition determination nodes included in a decision tree, and generating a unified instruction;
acquiring a plurality of pieces of input data; and
performing, by a parallel processing, condition determinations with respect to the plurality of pieces of input data using the unified instruction for each of the condition determination nodes.

According to still another example aspect of the present disclosure, there is provided a recording medium storing a program, the program causing a computer to perform a process including:
unifying respective instructions executed by condition determination nodes included in a decision tree, and generating a unified instruction;
acquiring a plurality of pieces of input data; and
performing, by a parallel processing, condition determinations with respect to the plurality of pieces of input data using the unified instruction for each of the condition determination nodes.

Effect of the Invention

According to the present disclosure, it becomes possible to speed up an inference process using a decision tree by a parallel processing.

BRIEF DESCRIPTION OF THE DRAWINGS

FIG. 4 illustrates an example of the decision tree model.

FIG. 5 illustrates a parallel processing conducted in a first layer of the decision tree model.

EXAMPLE EMBODIMENTS

In the following, example embodiments will be described with reference to the accompanying drawings.

FIRST EXAMPLE EMBODIMENT

Basic Configuration

Figure 1:
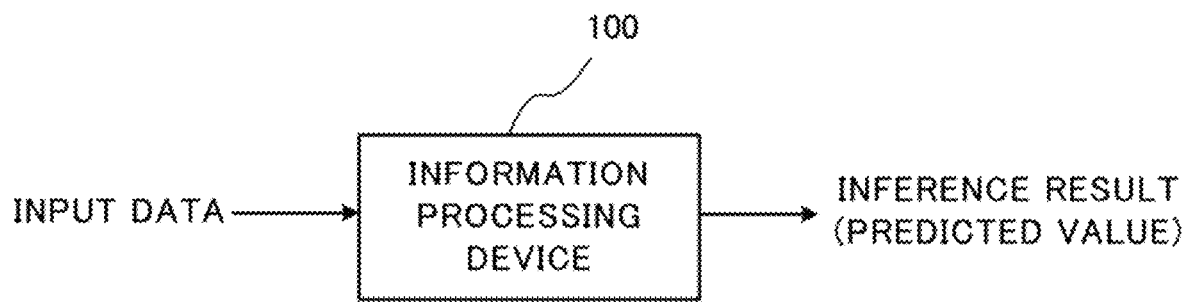
FIG. 1 is a block diagram illustrating a configuration of an information processing device according to a first example embodiment.

FIG. 1 illustrates a configuration of an information processing device according to a first example embodiment of the present invention. The information processing device 100 performs an inference using a decision tree model (hereinafter, referred to as a "decision tree inference"). Specifically, the information processing device 100 performs the decision tree inference using input data, and outputs a predicted value for the input data as an inference result. Here, the information processing device 100 executes a part of a process of the decision tree inference by a parallel processing to speed up the process. Note that the parallel processing is also referred to as a "vectorization".

Principle Explanation

Figure 2:
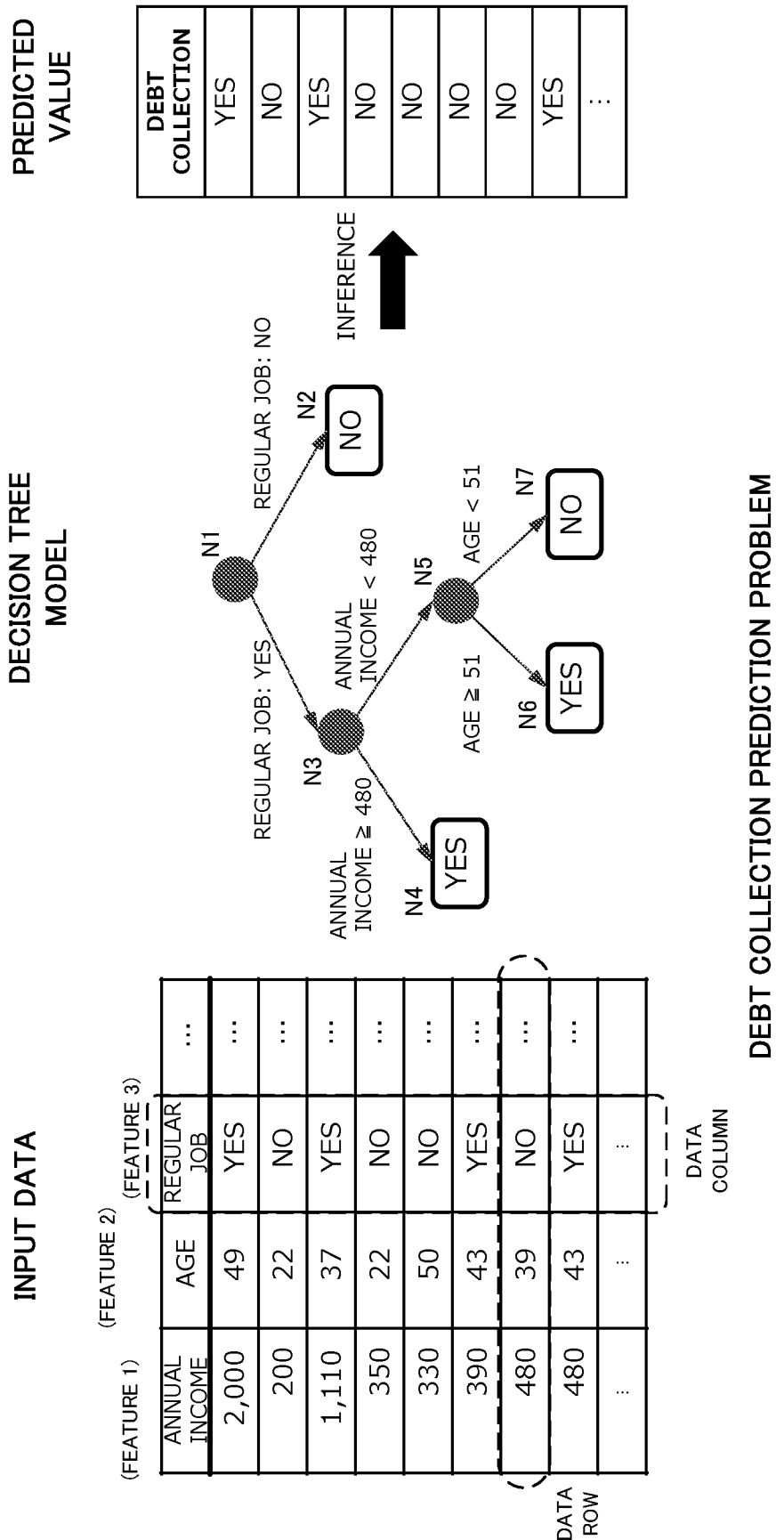
FIG. 2 illustrates an example of a decision tree inference.

FIG. 2 illustrates an example of the decision tree inference. This example is a prediction problem of a collection of a debt, and attribute information of a large number of debtors is used to be the input data, and the decision tree model is used to infer an availability of the collection of the debt. As depicted, the input data includes "annual income (feature 1)", "age (feature 2)", and "regular job (feature 3)" as features for each debtor. The decision tree model uses these pieces of input data to predict the availability of the collection of the debt for each debtor.

The decision tree model in FIG. 2 is formed by nodes N1 to N7. The node N1 is a root node and the nodes N2, N4, N6, and N7 are leaf nodes. The nodes N1, N3, and N5 are condition determination nodes.

First, at the root node N1, it is determined whether the debtor has a regular job or not. When the debtor does not have the regular job, the process advances to the leaf node N2, and the debt is predicted to be uncollectible (NO). On the other hand, in a case where the debtor has the regular job, the process advances to the condition determination node N3, and determines whether or not an annual income of the debtor is 4.8 million yen or more. With respect to the annual income of the debtor that is 4.8 million yen or more, the process advances to the leaf node N4, and the debt is predicted to be collectible (YES). With respect to the annual income of the debtor that is lower than 4.8 million yen, the process advances to the condition determination node N5, and determines whether or not an age of the debtor is 51 years or older. With respect to the age of the debtor that is 51 years or older, the process advances to the leaf node N6 and the debt is predicted to be collectible (YES). On the other hand, with respect to the age of the debtor that is younger than 51 years old, the process advances to the leaf node N7, and the debt is predicted to be uncollectible (NO). Accordingly, the availability for collecting the debt from each debtor is output as the predicted value.

Now, in a case of applying the parallel processing to the decision tree inference, it becomes a problem which part of the decision tree inference is processed in parallel. Although a method for processing data rows of the input data in parallel may be considered, since each data row may go down to a different child node, comparison instructions in the condition determination nodes may not be matched, and the parallel processing cannot be performed without modification. Therefore, in the present example embodiment, comparison instructions which are executed at respective condition determination nodes are forcibly unified. Specifically, different comparison instructions respective to condition determination nodes are converted into a single comparison instruction. As the comparison instruction is converted, the threshold defined by the comparison instruction is changed. Accordingly, it is possible to unify the comparison instructions of all condition determination nodes included in the decision tree to the same instruction, and it is possible to realize the parallel processing.

Figure 3:
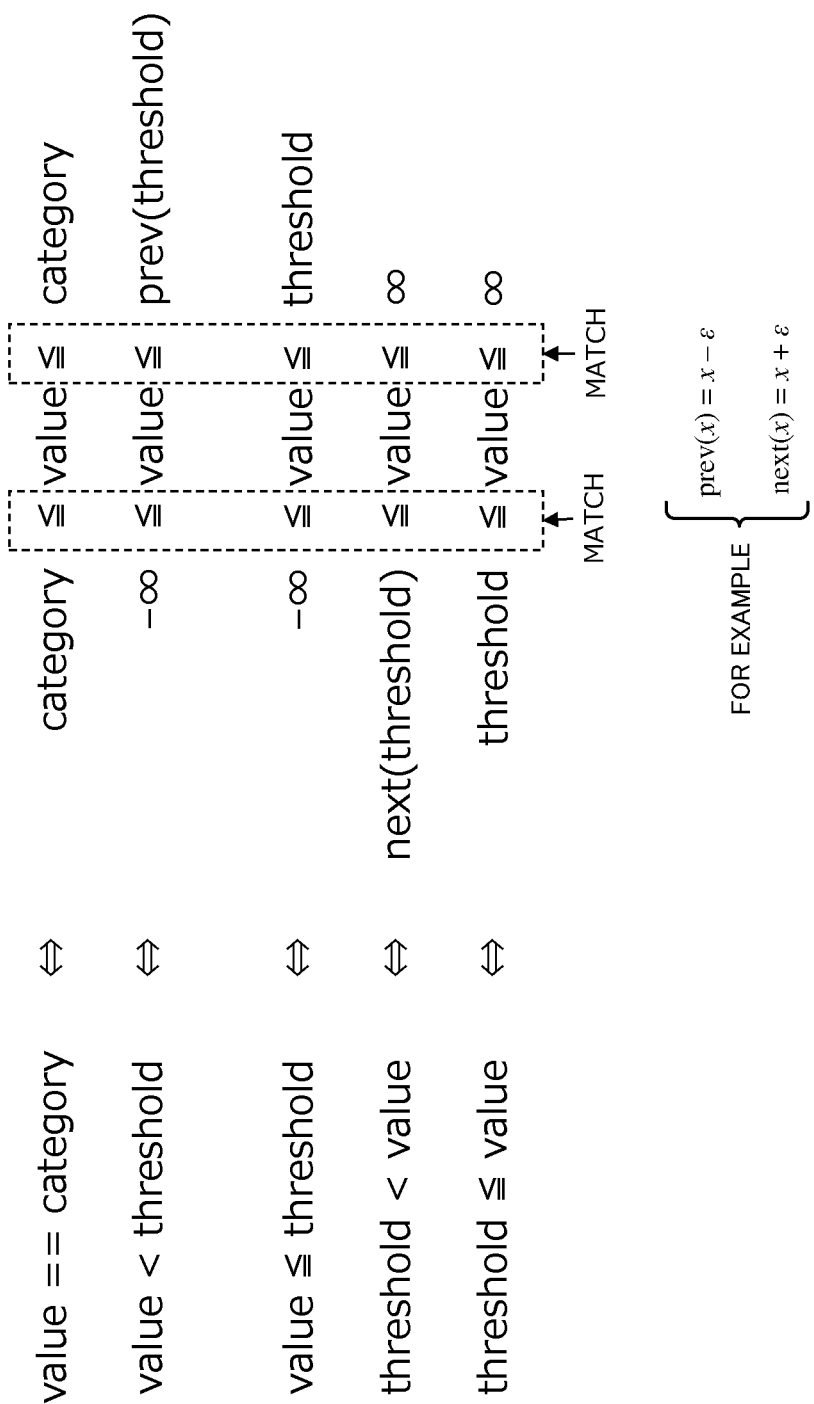
FIG. 3 illustrates method for unifying comparison instructions of a condition determination node.

FIG. 3 illustrates a method for unifying the comparison instructions of the condition determination nodes. As the comparison instruction performed at the condition determination node of the decision tree, there are basically a match determination and a magnitude determination, and each comparison instruction is classified into one of five comparison instructions as depicted in FIG. 3.

(1) Match determination (value==category)

It is determined whether or not a "value" indicating a value to be determined (hereinafter referred to as a "determination target value") is matched with a "category" indicating a category value.

(2) Magnitude determination (value<threshold)

It is determined whether or not the "value" indicating the determination target value is less than a "threshold" indicating the threshold value.

(3) Magnitude determination (value≤threshold)

It is determined whether or not the "value" indicating the determination target value is equal to or less than the "threshold" indicating the threshold value.

(4) Magnitude determination (threshold<value)

It is determined whether or not the "value" indicating the determination target value is greater than the "threshold" indicating the threshold value.

(5) Magnitude determination (threshold≤value)

It is determined whether or not the "value" indicating the determination target value is equal to or greater than the "threshold" indicating the threshold value.

In the present example embodiment, the information processing device 100 converts the above described five comparison instructions into one comparison instruction (hereinafter, also referred to as a "unified instruction") in the following form.

X≤value≤Y (X and Y are the threshold values)

Note that "X" corresponds to a first threshold, "Y" corresponds to a second threshold value.

Specifically, as depicted in FIG. 3, the five comparison instructions can be converted as follows.

(1) Match determination (value==category)

"Categories" indicating the same category value can be used to "category≤value≤category".

(2) Magnitude determination (value<threshold)

A "minus infinity ($-\infty$)" indicating a threshold value and a "threshold" indicating a threshold value can be used to convert into "$-\infty$≤value≤prev(threshold)".

(3) Magnitude determination (value≤threshold)

The "minus infinity ($-\infty$)" indicating the threshold value and the "threshold" indicating the threshold value can be used to convert into "$-\infty$≤value≤threshold".

(4) Magnitude determination (threshold<value)

A "next (threshold)" indicating a threshold value and an "infinity ($\infty$)" indicating a threshold value can be used to convert into "next(threshold)≤value≤$\infty$".

(5) Magnitude determination (threshold≤value)

The "threshold" indicating the threshold value and the "infinity ($\infty$)" indicating the threshold value can be used to convert into "threshold≤value≤$\infty$".

Note that when functions prey( ) and next( ) are intuitively represented as prev( )=x-ε and next( )-x+ε, respectively, where ε is a small positive number. Although a threshold value used in a comparison instruction is of a real number type, since the threshold value is an expression with finite precision, there exists a value b such that "there is no representable value between a and b" for a certain value a. A value of prev(threshold) is a value that is less than the threshold value and has no expressible value between the value of prev(threshold) and the "threshold". A value of next(threshold) is a value that is greater than the "threshold" and is not representable between the value and the "threshold". In other words, the value of prev(threshold) is a value (hereinafter, also referred to as an "adjacent value") that is less than the "threshold" and is adjacent to the "threshold" among discrete values in a predetermined resolution (that is, 32-bit, 64-bit, or the like). Similarly, the value of next (threshold) is a value that is greater than the "threshold" and is adjacent to the "threshold" among the discrete values in the predetermined resolution. In practice, the values of prev(threshold) and next(threshold) can be obtained by using a function "nextafter( )" in a standard library for C language, for instance.

Accordingly, by unifying individual comparison instructions used in the condition determination nodes of the decision tree to the same comparison instruction, even in a case where each data row goes down to different child nodes in the decision tree, it is possible to process the comparison instructions of all condition determination nodes in parallel.

CONCRETE EXAMPLE

Next, a specific example in which the comparison instructions executed by the condition determination nodes are unified and processed in parallel will be described. FIG. 4 illustrates an example of the decision tree model. In this instance, the decision tree model has nodes 1 to 11 and 14 to 15, nodes 1 to 5 and 7 are the condition determination nodes, and nodes 6, 8 to 11, and 14 to 15 are the leaf nodes. One determination among the aforementioned match determination and four magnitude determinations is set to each of the condition determination nodes. With respect to the determination result that indicates "true" in each condition determination node, the process advances to a child node on a left side in FIG. 4, and with respect to the determination result that indicates "false", the process advances to a child node on a right side in FIG. 4. As the data to be inferred, eight pieces of data (data numbers 1 to 8) each having features A to C are prepared.

FIG. 5 illustrates the parallel processing performed in a first layer of the decision tree model. In the first layer, a comparison instruction of [A]<5 is executed using the feature A in a current location (current location node) 1. Note that notations of [A], [B], and [C] in FIG. 4 to FIG. 8 indicate the feature A, the feature B, and the feature C, respectively. In this case, the information processing device 100 converts a comparison instruction "[A]<5" of the node 1 into a form of the unified instruction "X≤value≤Y" described with reference to FIG. 3. Specifically, the information processing device 100 converts the comparison instruction "[A]<5" at the node 1 into a unified instruction "–∞≤[A]≤4.999••". In a column of "current state" in FIG. 5, a comparison operation performed using a unified instruction is represented. Accordingly, the information processing device 100 calculates the unified instruction "–∞≤[A] ≤4.999••" for each piece of data 1 to 8, and outputs a determination result "true" or "false". Thus, the inference process of the first layer of the decision tree model is completed, and the process moves to a second layer.

Figure 6:
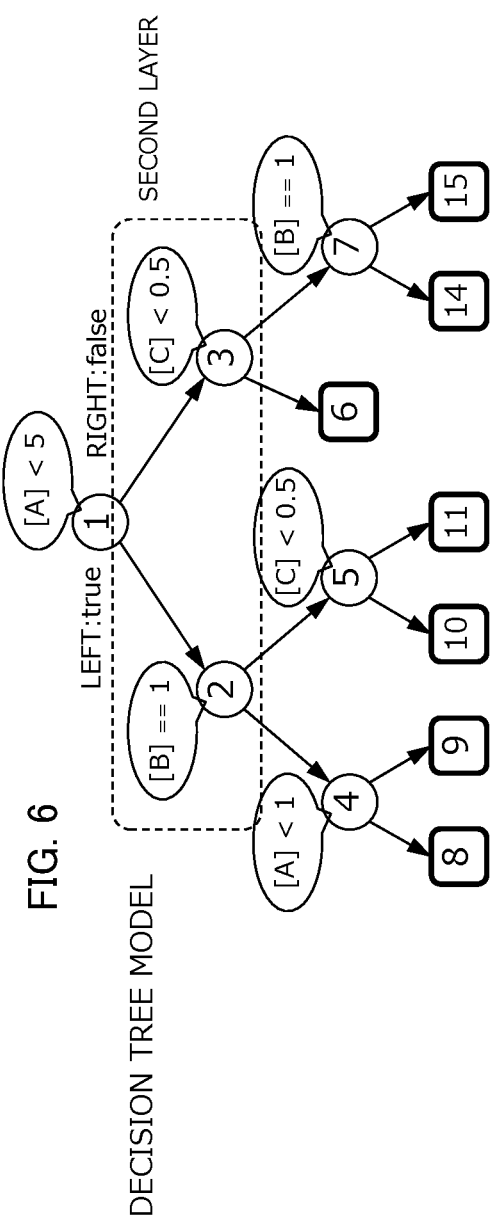
FIG. 6 illustrates the parallel processing conducted in a second layer of the decision tree model.

FIG. 6 illustrates the parallel processing performed in the second layer of the decision tree model. In the second layer, a comparison instruction of [B]==1 is executed using the feature B for the data that has progressed to the node 2. Moreover, a comparison instruction of [C]<0.5 is executed using the feature C for the data that have advanced to the node 3. In this case, the information processing device 100 converts a comparison instruction [B]=1 of the node 2 into a unified instruction "1≤[B]≤1". Furthermore, the information processing device 100 converts the comparison instruction [C]<0.5 of the node 3 into a unified instruction "–∞≤ [A]≤4.999••". After that, the information processing device 100 calculates the unified instruction "1≤[B]≤1" for the data 1, 2, 4, and 6, calculates the unified instruction "–∞≤[C] ≤4.999••" for the data 3, 5, 7, and 8, and outputs a determination result. Accordingly, the inference process of the second layer of the decision tree model is completed, and the process moves to a third layer.

Figure 7:
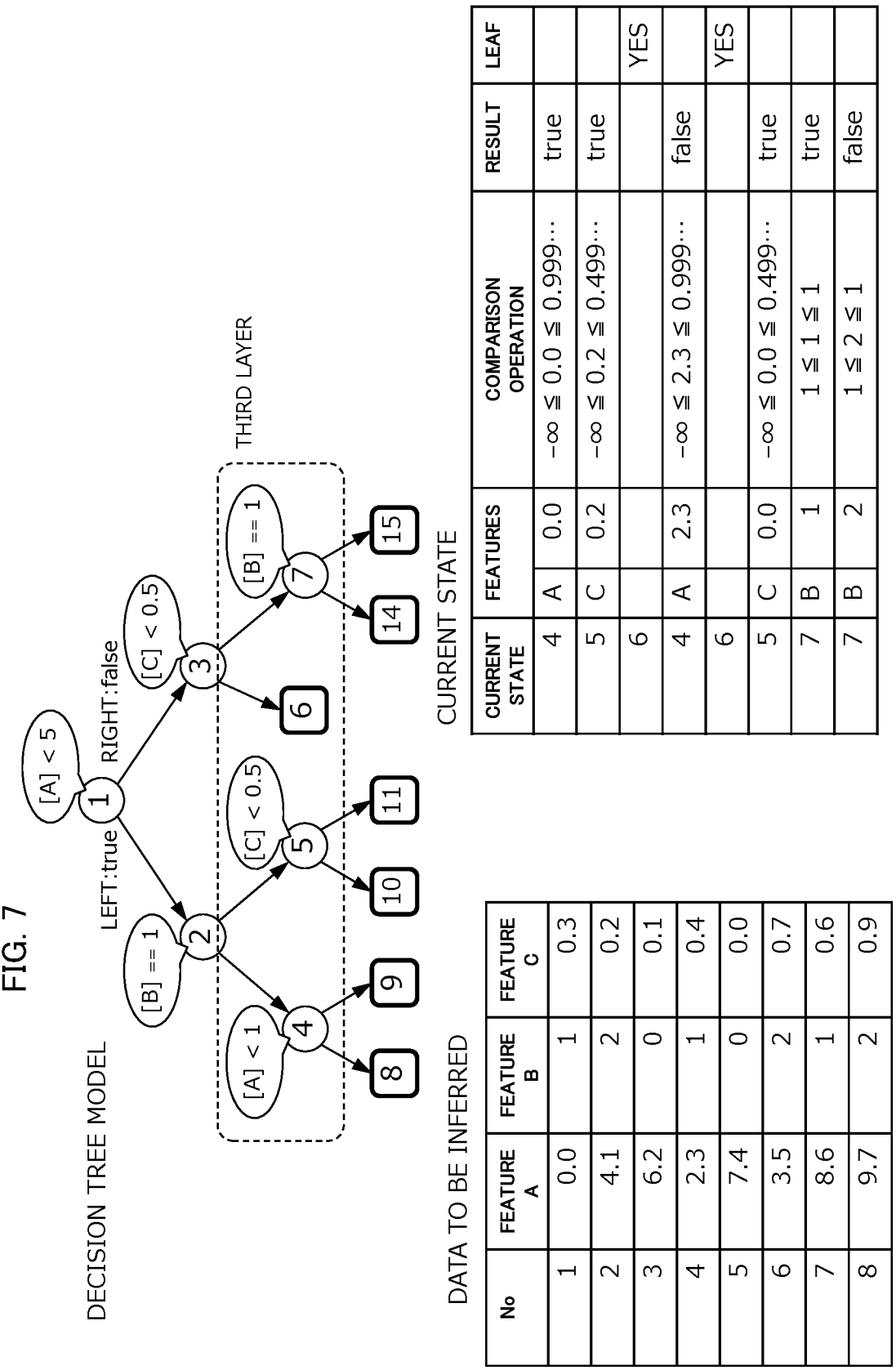
FIG. 7 illustrates the parallel processing conducted in a third layer of the decision tree model.

FIG. 7 illustrates the parallel processing performed in the third layer of the decision tree model. In the third layer, a comparison instruction of [A]<1 is executed using the feature A for the data that have advanced to the node 4. With respect to the data that have advanced to the node 5, the comparison instruction of [C]<0.5 is executed using the feature C. Since the node 6 is the leaf node, no process is performed for the node 6. With respect to the data that have advanced to the node 7, the comparison instruction of [B]==1 is executed using the feature B. In this case, the information processing device 100 converts the comparison instruction [A]<1 of the node 4 to the unified instruction "–∞≤[A]≤4.999••", converts the comparison instruction [C]<0.5 of the node 5 to the unified instruction "–∞≤[C] ≤4.999••", and converts the comparison instruction [B]=1 of the node 7 to the unified instruction "1[B]1". Next, the information processing device 100 calculates the unified instruction "–∞≤[A]≤4.999••" for the data 1 and the data 4, calculates the unified instruction "–∞≤[C]≤4.999••" for the data 2 and the data 6, calculates the unified instruction "1≤[B]≤1" for the data 7 and the data 8, and outputs a determination result. After that, the inference process of the third layer in the decision tree model is completed, and the process moves to a fourth layer.

Figure 8:
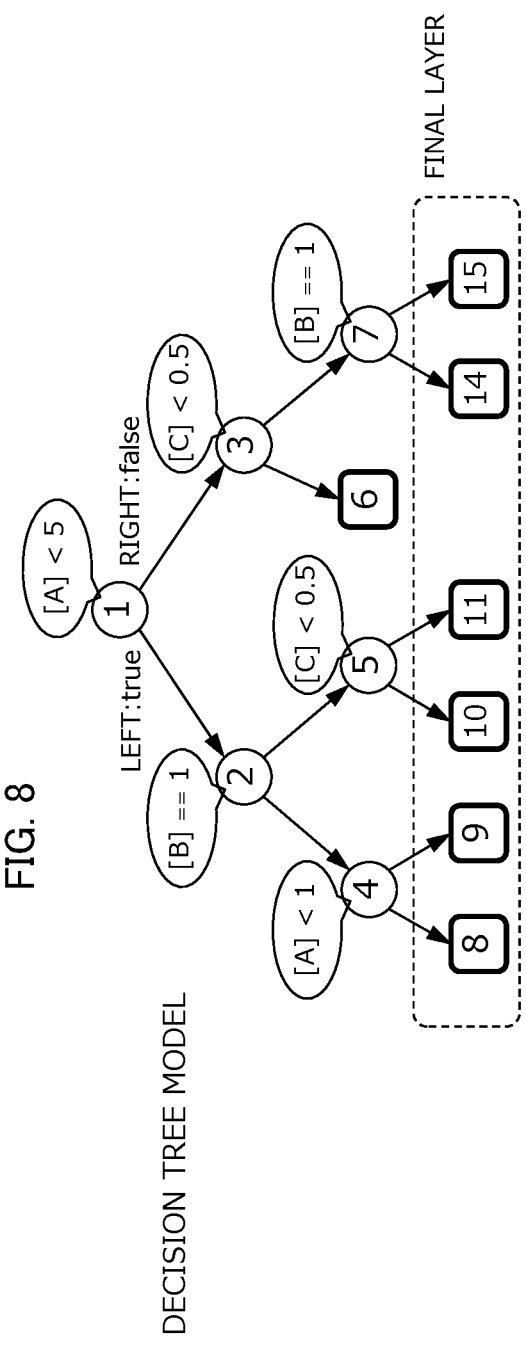
FIG. 8 illustrates a state of a fourth layer of the decision tree model.

FIG. 8 illustrates a state of the fourth layer of the decision tree model. In the fourth layer, since all nodes 8 to 11 and 14 to 15 are the leaf nodes, all data 1 to 8 have reached the leaf nodes. Accordingly, the inference process is terminated. The "current state" represents that all data 1 to 8 have reached the leaf nodes.

As described above, according to the information processing device 100 of the present example embodiment, since the different comparison instruction which is set in each of the condition determination nodes of the determination tree is converted into the unified instruction by adjusting each threshold value, even in a case where the condition determination node is different for each piece of data, the parallel processing can be performed on all data.
(Hardware Configuration)

Figure 9:
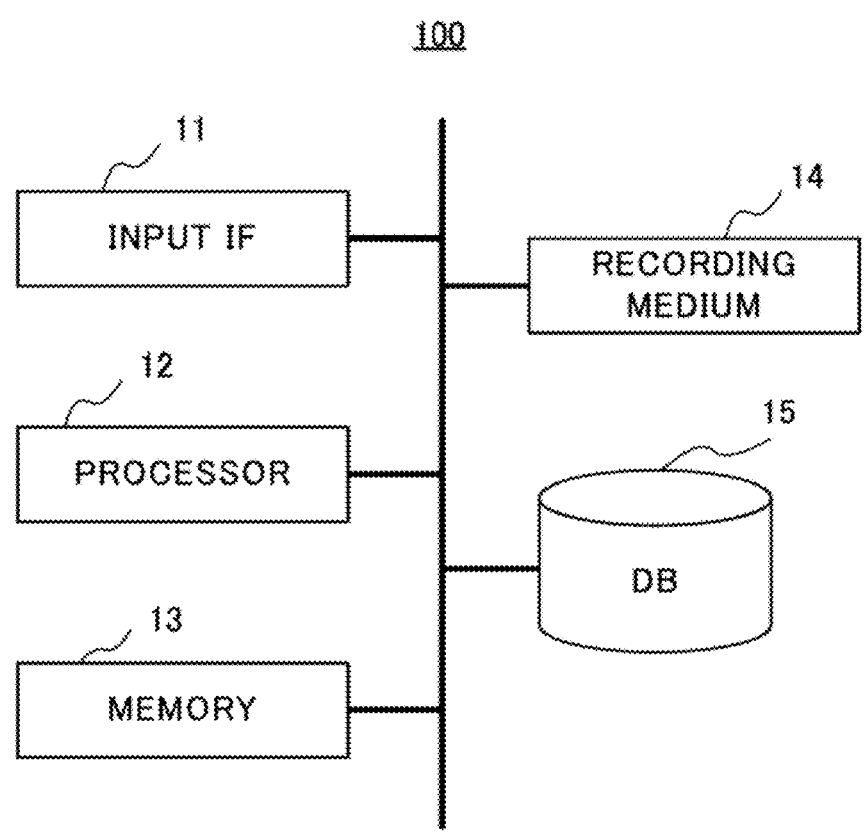
FIG. 9 is a block diagram illustrating a hardware configuration of the information processing device.

FIG. 9 is a block diagram illustrating a hardware configuration of the information processing device 100. As illustrated, the information processing device 100 includes an input IF (InterFace) 11, a processor 12, a memory 13, a recording medium 14, and a database (DB) 15.

The input IF 11 inputs and outputs data. Specifically, the input IF 11 acquires input data from an outside, and outputs the inference result generated by the information processing device 100 based on the input data.

The processor 12 corresponds to one or more processors each being a computer such as a CPU (Central Processing Unit) or a GPU (Graphics Processing Unit), and controls the entire information processing device 100 by executing programs prepared in advance. In particular, the processor 12 performs the parallel processing of the data. As one method for realizing the parallel processing, there is a method of using a SIMD processor such as the GPU. In a case where the information processing device 100 performs the parallel processing using the SIMD processor, the processor 12 may be the SIMD processor or the SIMD processor may be provided as a separate processor from the processor 12. Also, in the latter case, the information processing device 100 causes the SIMD processor to execute an operation capable of the parallel processing, and causes the processor 12 to execute other operations.

The memory 13 is formed by a ROM (Read Only Memory), a RAM (Random Access Memory), and the like. The memory 13 stores various programs to be executed by the processor 12. The memory 13 is also used as a working memory during the execution of various processes by the processor 12.

The recording medium 14 is a non-volatile and non-transitory recording medium such as a disk-shaped recording medium, a semiconductor memory, and is formed to be detachable from the information processing device 100. The recording medium 14 records various programs executed by the processor 12.

The DB 15 stores data input from the input IF 11. Specifically, the input data acquired by the input IF 11 are stored in the DB 15. In addition, the DB 15 stores information of the decision tree model used for the inference. In detail, information indicating a tree structure of the trained decision tree model and node settings (a condition determination node setting and a leaf node setting) are stored for each node.

Functional Configuration

Figure 10:
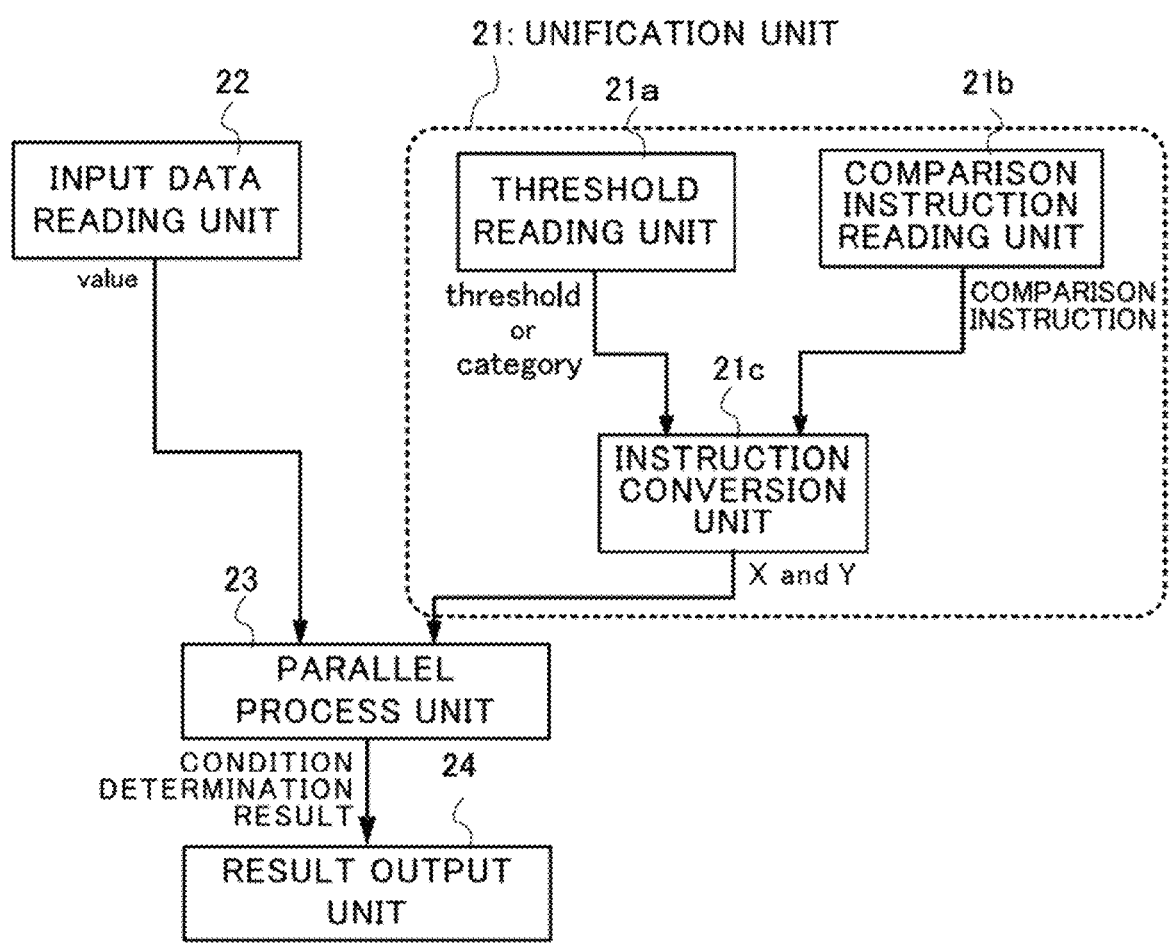
FIG. 10 is a block diagram illustrating a functional configuration of the information processing device.

FIG. 10 is a block diagram illustrating a functional configuration of the information processing device 100. The information processing device 100 includes a unification unit 21, an input data reading unit 22, a parallel process unit 23, and a result output unit 24. Moreover, the instruction unit 21 includes a threshold reading unit 21a, a comparison instruction reading unit 21b, and an instruction conversion unit 21c.

The instruction unification unit 21 acquires a comparison instruction for each condition determination node included in the decision tree, and performs a process for converting the result into the unified instruction as described above. Specifically, the threshold reading unit 21a reads the threshold value (threshold) or the category value (category) for each condition determination node, and outputs the read value to the instruction conversion unit 21c. The comparison instruction reading unit 21b reads the comparison instruction for each condition determination node, and outputs the read instruction to the instruction conversion unit 21c. For instance, in the case of the condition determination node 1 depicted in FIG. 4, the threshold reading unit 21a reads a threshold value "5", and the comparison instruction reading unit 21b reads the comparison instruction "[A]<threshold". Moreover, in the case of the condition determination node 2 depicted in FIG. 4, the threshold reading unit 21a reads the category value "1", and the comparison instruction reading unit 21b reads the comparison instruction "[B]=category".

The instruction conversion unit 21c converts the comparison instruction into a unified instruction of the form "X≤value≤Y" based on the input threshold value or the input category value and the comparison instruction. Here, with respect to the input comparison instruction that is the match determination, the instruction conversion unit 21c uses the input category value as the threshold values X and Y. On the other hand, with respect to the input comparison instruction that is the magnitude determination, the instruction conversion unit 21c changes the threshold value in accordance with the unification instruction. That is, the instruction conversion unit 21c creates the threshold values X and Y in the unified instruction from the input threshold so that the input comparison instruction has a form of "X≤value≤Y". For instance, in a case of the condition determination node 1 illustrated in FIG. 4, the instruction conversion unit 21c converts the comparison instruction "[A]<5" of the node 1 into the form of the unified instruction "X≤[A]≤Y" and determines the threshold values X and Y as "−∞" and "4.999 . . . ", respectively. As a result, the instruction conversion unit 21c converts the comparison instruction "[A]<5" at the node 1 into the unified instruction "−∞≤[A] ≤4.999••", respectively. Accordingly, the instruction unification unit 21 converts the comparison instructions of all condition determination nodes included in the decision tree model into the unified instruction, and outputs the unified instruction to the parallel process unit 23.

The input data reading unit 22 reads the input data to be inferred by the decision tree model, and outputs the input data to the parallel process unit 23. In the example of FIG. 4, the input data reading unit 22 reads the data 1 to the data 8. The parallel process unit 23 processes all input data in parallel using the unified instruction being input, and generates the condition determination result. Specifically, the parallel process unit 23 performs the condition determination by the parallel processing for each of the input data 1 to the input data 8 using the unified instruction, as illustrated in the column of the "current state" in FIG. 5 to FIG. 7. Next, the parallel process unit 23 outputs the obtained condition determination result to the result output unit 24. The result output unit 24 outputs the condition determination result being input to an external device or the like.

In the above configuration, the instruction unification unit 21 is an example of the instruction unification means, the input data reading unit 22 is an example of the acquisition means, and the parallel process unit 23 is an example of the condition determination unit.

Condition Determination Process

Figure 11:
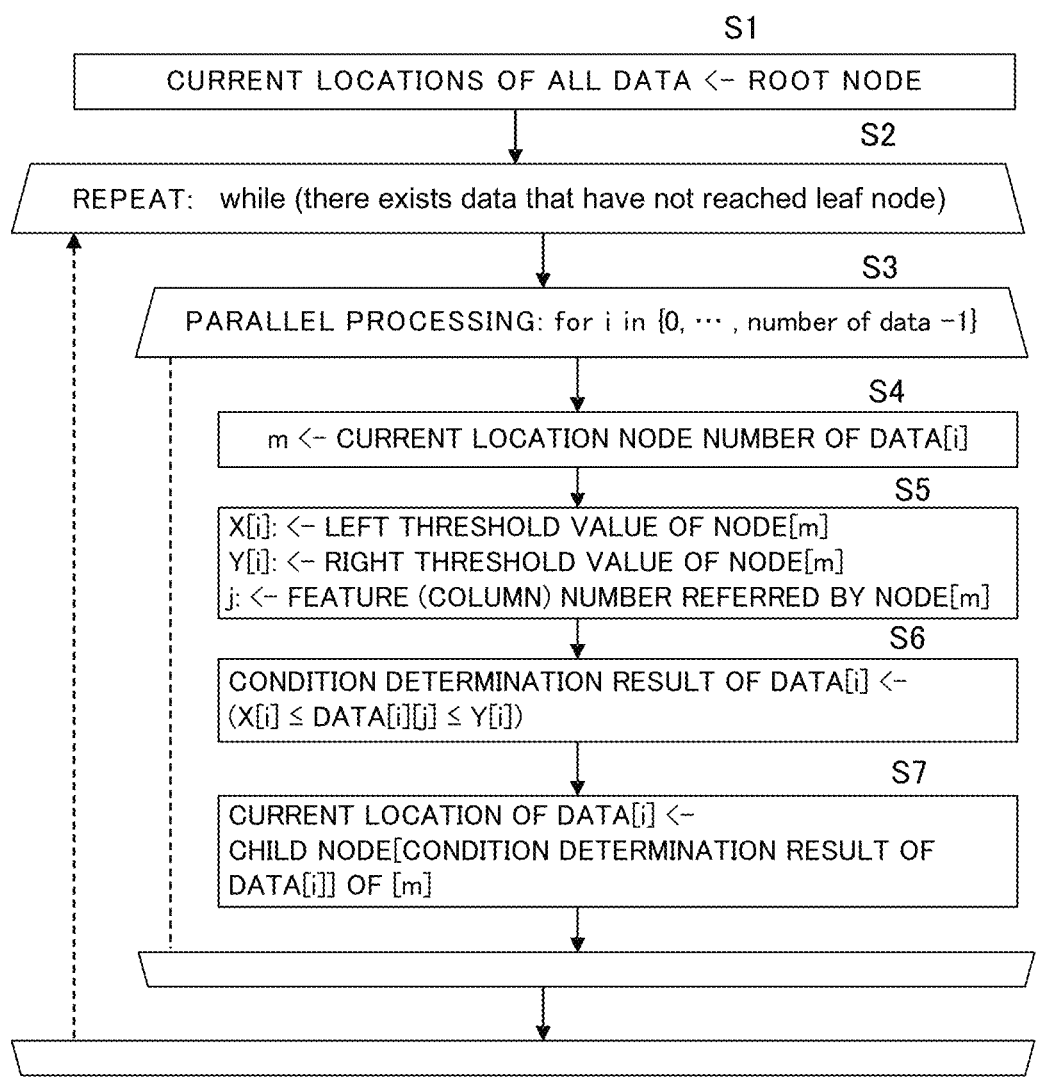
FIG. 11 is a flowchart of a condition determination process executed by a parallel processing unit.

FIG. 11 is a flowchart of the condition determination process executed by the parallel process unit 23. This process is realized by the processor 12 depicted in FIG. 9, which executes a program prepared in advance. Prior to this process, it is assumed that the instruction unification unit 21 depicted in FIG. 10 performs a pre-process which converts the comparison instruction to the unified instruction as described above for each of the condition determination nodes included in the decision tree model used for the inference.

First, the parallel process unit 23 sets a root node to the current location of all data (current location nodes) (step S1). Next, the parallel process unit 23 repeats the parallel processing of steps S4 to S7 while there exist data that has not reached the leaf node (step S3). In the parallel processing of steps S4 to S7, the parallel process unit 23 sets the current location node number of data [i] being i-th data to "m" (step S4). Accordingly, the current location node is set for each piece of data.

Next, the parallel process unit 23 sets a left threshold value of the unified instruction of the current location node [m] to X[i], sets a right threshold value of the unified instruction of the current location node [m] to Y[i], and sets a feature number referred to by the unified instruction of the current location node [m] to "j" (step S5). Accordingly, the unified instruction to be executed is acquired for each piece of data. Next, the parallel process unit 23 executes the unified instruction for each piece of data. In detail, the parallel process unit 23 determines whether or not (X[i] ≤data[i][j]) and (data[i]≤Y[i]) are satisfied, and sets "true" or "false" to the condition determination result of the data[i] (step S6). Next, the parallel process unit 23 sets each child node of the current location node [m] corresponding to the condition determination result of the data[i] to the current location of the data[i] (step S7).

Accordingly, the parallel process unit 23 executes the parallel processing of steps S4 to S7 for all data. As long as there exist data that have not reached the leaf node, the parallel process unit 23 executes the parallel processing of steps S4 to S7 while moving the current location to a lower layer in the decision tree model, and terminates the condition determination process when all data reach the leaf nodes.

SECOND EXAMPLE EMBODIMENT

Figure 12:
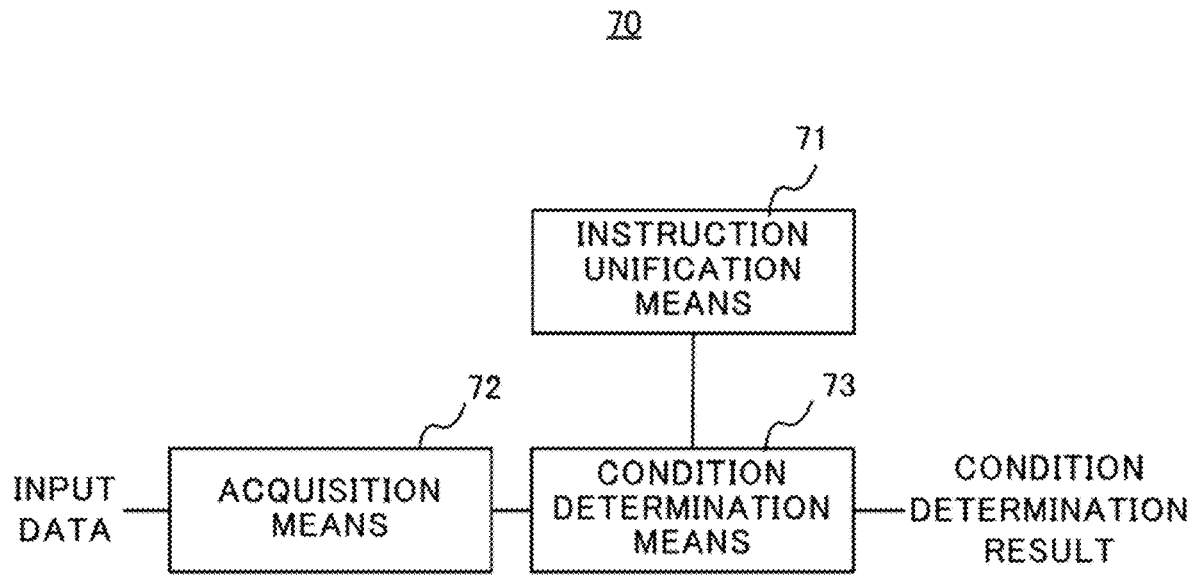
FIG. 12 is a block diagram illustrating a functional configuration of the information processing device according to a second example embodiment.

FIG. 12 is a block diagram illustrating a functional configuration of an information processing device 70 according to a second example embodiment. The information processing device 70 performs the decision tree inference based on the decision tree having the condition determination node and the leaf node. The information processing device 70 includes an instruction unification means 71, an acquisition means 72, and a condition determination means 73. The instruction unification means 71 generates a unified instruction by unifying instructions executed by the condition determination nodes included in the decision tree so as to be suitable for the parallel processing. The acquisition means 72 acquires a plurality of pieces of the input data. The condition determination means 73 performs respective condition determinations for the plurality of pieces of input data in the parallel processing using the uniform instruction for each condition determination node, and outputs the condition determination result.

A part or all of the example embodiments described above may also be described as the following supplementary notes, but not limited thereto.

Supplementary Note 1

1. An information processing device comprising:
an instruction unification means configured to unify respective instructions executed by condition determination nodes included in a decision tree, and generate a unified instruction;
an acquisition means configured to acquire a plurality of pieces of input data; and
a condition determination means configured to perform, by a parallel processing, condition determinations with respect to the plurality of pieces of input data using the unified instruction for each of the condition determination nodes.

Supplementary Note 2

2. The information processing device according to supplementary note 1, wherein the instruction unification means changes a threshold value for each of the condition determination nodes in order for all condition decision nodes included in the decision tree to execute the unified instruction.

Supplementary Note 3

3. The information processing device according to supplementary note 2, wherein the unified instruction is a comparison instruction that determines whether or not a value to be determined in each of the condition decision nodes is equal to or greater than a first threshold value and is equal to or less than a second threshold value.

Supplementary Note 4

4. The information processing device according to supplementary note 3, wherein the instruction unification means converts an instruction that determines whether or not the value to be determined is less than a predetermined value, into an instruction that determines whether or not the value to be determined is equal to or greater than minus infinity and is equal to or less than an adjacent value.

Supplementary Note 5

5. The information processing device according to supplementary note 4, wherein the instruction unification means converts an instruction that determines whether or not the value to be determined is greater than a predetermined value, into an instruction that determines whether or not the value to be determined is equal to or greater than an adjacent value being greater than the predetermined value and is equal to or less than plus infinity.

Supplementary Note 6

6. The information processing device according to any one of supplementary notes 3 to 5, wherein the instruction unification means converts an instruction that determines whether or not the value to be determined matches a predetermined value, into an instruction that determines whether or not the valued to be determined is equal to or less than the predetermined value and is equal to or greater than the predetermined value.

Supplementary Note 7

7. The information processing device according to any one of supplementary notes 3 to 6, wherein the instruction unification means converts an instruction that determines whether or not the value to be determined is equal to or less than a predetermined value, into an instruction that determines whether or not the value to be determined is equal to or greater than minus infinity and is equal to or less than the predetermined value.

Supplementary Note 8

8. The information processing device according to supplementary note 7, wherein the instruction unification means converts an instruction that determines whether or not the value to be determined is equal to or greater than a predetermined value, into an instruction that determines whether or not the value to be determined is equal to or greater than the predetermined value and is equal to or less than plus infinity.

Supplementary Note 9

9. The information processing device according to any one of supplementary notes 1 to 8, wherein the condition determination means performs a parallel SIMD processing.

Supplementary Note 10

10. An information processing method, comprising:
unifying respective instructions executed by condition determination nodes included in a decision tree, and generating a unified instruction;
acquiring a plurality of pieces of input data; and
performing, by a parallel processing, condition determinations with respect to the plurality of pieces of input data using the unified instruction for each of the condition determination nodes.

Supplementary Note 11

11. A recording medium storing a program, the program causing a computer to perform a process comprising:
unifying respective instructions executed by condition determination nodes included in a decision tree, and generating a unified instruction;
acquiring a plurality of pieces of input data; and
performing, by a parallel processing, condition determinations with respect to the plurality of pieces of input data using the unified instruction for each of the condition determination nodes.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

12 Processor
21 Unification unit
21a Threshold reading unit
21b Comparison instruction reading unit
21c Instruction conversion unit
22 Input data reading unit
23 Parallel process unit
24 Result output unit
100 Information processing device

What is claimed is:

1. An information processing device comprising:
a memory storing instructions; and
one or more processors configured to execute the instructions to:
convert each of instructions executed by all condition determination nodes included in a decision tree to a unified instruction;
acquire a plurality of pieces of input data; and
perform, by parallel processing, condition determinations with respect to the plurality of pieces of input data using the unified instruction for each of the condition determination nodes,
wherein the one or more processors convert each of the instructions to the unified instruction by:
converting each of the instructions executed by all the condition determination nodes to a comparison instruction which determines whether or not a determination target value in each of the condition determination nodes is equal to or greater than a first threshold value and is equal to or less than a second threshold value; and
determining the first threshold value and the second threshold value.

2. The information processing device according to claim 1, wherein the one or more processors convert an instruction that determines whether or not the determination target value in one of the condition determination nodes is less than a predetermined value, into an instruction that determines whether or not the determination target value in the one of the condition determination nodes is equal to or greater than minus infinity and is equal to or less than an adjacent value.

3. The information processing device according to claim 2, wherein the one or more processors convert an instruction that determines whether or not the determination target value in a second one of the condition determination nodes is greater than a predetermined value, into an instruction that determines whether or not the determination target value in the second one of the condition determination nodes is equal to or greater than an adjacent value being greater than the predetermined value and is equal to or less than plus infinity.

4. The information processing device according to claim 1, wherein the one or more processors convert an instruction that determines whether or not the determination target value in one of the condition determination nodes matches a predetermined value, into an instruction that determines whether or not the determination target value in the one of the condition determination nodes is equal to or less than the predetermined value and is equal to or greater than the predetermined value.

5. The information processing device according to claim 1, wherein the one or more processors convert an instruction that determines whether or not the determination target value in one of the condition determination nodes is equal to or less than a predetermined value, into an instruction that determines whether or not the determination target value in the one of the condition determination nodes is equal to or greater than minus infinity and is equal to or less than the predetermined value.

6. The information processing device according to claim 5, wherein the one or more processors convert an instruction that determines whether or not the determination target value in a second one of the condition determination nodes is equal to or greater than a predetermined value, into an instruction that determines whether or not the determination target value in the second one of the condition determination nodes is equal to or greater than the predetermined value and is equal to or less than plus infinity.

7. The information processing device according to claim 1, wherein the one or more processors perform parallel SIMD processing.

8. An information processing method performed by one or more processors and comprising:
converting each of instructions executed by all condition determination nodes included in a decision tree to a unified instruction;
acquiring a plurality of pieces of input data; and
performing, by parallel processing, condition determinations with respect to the plurality of pieces of input data using the unified instruction for each of the condition determination nodes,
wherein converting each of the instructions to the unified instruction comprises:
converting each of the instructions executed by all condition determination nodes to a comparison instruction which determines whether or not a determination target value in each of the condition determination nodes is equal to or greater than a first threshold value and is equal to or less than a second threshold value; and determining the first threshold value and the second threshold value.

9. A non-transitory computer-readable recording medium storing a program causing a computer to perform a process comprising:

converting each of instructions executed by all condition determination nodes included in a decision tree to a unified instruction;

acquiring a plurality of pieces of input data; and performing, by a parallel processing, condition determinations with respect to the plurality of pieces of input data using the unified instruction for each of the condition determination nodes, wherein converting each of the instructions to the unified instruction comprises:

converting each of the instructions executed by all condition determination nodes to a comparison instruction which determines whether or not a determination target value in each of the condition determination nodes is equal to or greater than a first threshold value and is equal to or less than a second threshold value; and determining the first threshold value and the second threshold value.

* * * * *